United States Patent Office 3,384,945
Patented May 28, 1968

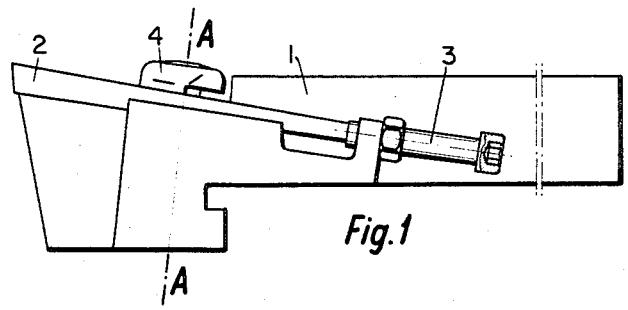
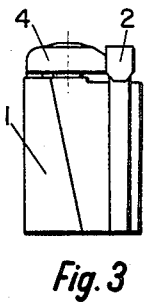
Fig. 1
Fig. 3
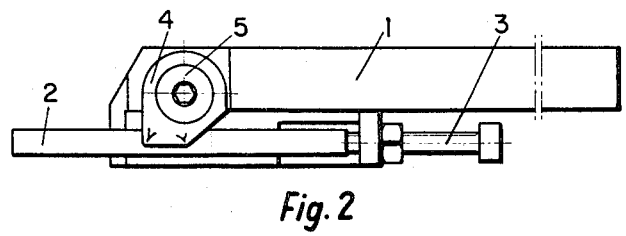
Fig. 2

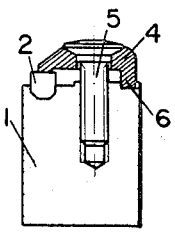
Fig. 4
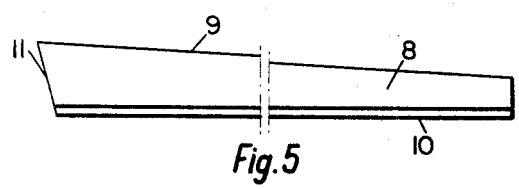 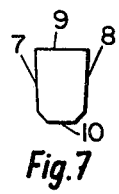
Fig. 5          Fig. 7
Fig. 6

3,384,945
CUT-OFF TOOL HOLDER AND BLADE
Mikotaj Kujawiak, Chaciszewskiego 54bm4, and Zenon Takomy, Dzierznskiego 164m8, both of Poznan, Poland
Filed Oct. 11, 1965, Ser. No. 494,417
Claims priority, application Poland, Oct. 13, 1964,
P 105,965
4 Claims. (Cl. 29—96)

ABSTRACT OF THE DISCLOSURE

A cut-off tool having a holder with a blade supported therein inclined with the horizontal and having a base of uniform trapezium shape which is accommodated in a corresponding groove in the holder, the blade having increased depth from back to front.

---

The invention relates to a cut-off tool holder provided with a device for mechanically supporting a blade which may be made both of high-speed steel or of sintered metals or of some other abrasion-resistant material.

According to the hitherto known art there are known cutters containing an exchangeable blade or cutter-bit with a hard soldered sinter plate such as described in Polish Patent No. 39,742. Moreover there are known holders for blades made of sintered metals and fixed without soldering by means of a wedge-like clamping element. Such cutters are shown in Polish Patent No. 40,769. There are also known cutter holders adapted for quick replacement of multiedged blades made of sintered metals.

These known constructions did not find application in cut-off tools because the small width of the blades of these cutters makes it impossible to use known devices for mechanical fastening. For these reasons, in leading tool factories of the world, cut-off tools are made in two traditional modifications—with weldable working parts of high-speed steel or with welded plates of sintered metals.

These known cut-off tool constructions reveal a number of disadvantages. They require sharpening of three or four planes. This is a laborious operation and causes unfavorable changes in the blade geometry. Sharpening shortens the length of the cutting-in part of the blade, limits the depth of machining and causes rapid wear of the cutter. In scrapped cutters equipped with a working part of high-speed steel the valuable alloy steel becomes wasted, while cut-off tools with soldered blades of sinter metals reveal the disadvantage that the operation of soldering is not fully mastered. Small inaccuracies and stresses in soldering cause cracks, and the plates become broken away.

The aim of the invention is to avoid said disadvantages by providing a cut-off tool having exchangeable blades of high-speed steel or of sintered metals, with a mechanical support for the blades, with decreased width of the blades in relation to the ISO standard and with increase of the length of the cutting part.

The present invention consists in providing a cutter holder having normalized dimensions which at one end has a longitudinal right hand or left hand shoulder. In this shoulder there is a longitudinal shaped groove open at the top, into which the exchangeable blade is placed. The end of the cutter holder is provided with an element which secures the blade in the groove by pressing it from above. In the forepart of the shoulder there is a projection supporting the cutting part of the blade, while in the rear part there is a regulation screw.

Further characteristic features and advantages of the invention are shown by way of example in the accompanying drawing in which:

FIG. 1 is a side view of a holder with a fixed exchangeable blade,
FIG. 2 is a top view of the holder according to FIG. 1;
FIG. 3 is a front view of the holder;
FIG. 4 is a section view of the holder taken along the line A—A in FIG. 1, and
FIGS. 5–7 show the exchangeable blade respectively in side elevation plan and end elevation views.

A cutter holder 1 is provided at one end with a longitudinal side shoulder 1 which is shaped as a narrow rib for constituting a support for the cutting part of a blade 2. In the shoulder there is provided a profiled groove, preferably in form of a reversed isosceles trapezium 1" open towards the top. In this groove there is placed a slidable exchangeable blade 2 which is supported at the back by a regulation screw 3. The blade 2 is pressed from above into groove 1" by a push member 4 preferably fastened by means of a screw with a hexagonal seat 5. The push member 4 is provided with a projection 6 received in an opening of the holder 1 and holding the push member 4 against rotation when the screw 5 is loosened. The holder 1 together with the side shoulder has a downwardly directed projection in its front part extending over the whole width of the holder. The rear plane of this projection is exactly perpendicular to the axis of the holder. Due to such a construction, the plane of the projection is applied against the cutter holder, the blade is exactly perpendicular to the workpiece to be cut. This shortens the time which is necessary for setting the cutter and increases the smoothness of the surface resulting from the cut. One obtains also the additional advantage that the tool is more rigidly supported. In a further development of the invention, the forepart of the shoulder, supporting the cutting part of the blade, is of the same thickness over its entire height, which increases still more the rigidity of the tool in relation to known tools in which the thickness must decrease downwardly.

According to a further feature of the invention, the exchangeable blade 2 has a new and favorable shape. The side planes 7 and 8 of the blade are somewhat convergent downwardly but they are not convergent towards the back of the tool. Auxiliary relief angles are obtained solely due to the fact that the plane 9 is inclined in relation to the base 10 of the blade. This construction give a number of various advantages. The blade when placed in a groove of any inclination may assume various angles which remain unchanged in spite of sharpening, because only the main relief face of the blade is subjected to sharpening. As sharpening proceeds, the insert is advanced towards the front, whereby the length of the cutting part of the blade is maintained.

The lack of convergence towards the back of the planes 7 and 8 assures a good adhesion of the blade in the groove in spite of its being gradually advanced towards the front. The shape of the groove in the shoulder, the shape of the push member 4 and the rearward inclination of the plane 9 serve to increase the connection of the blade 2 with the holder 1 when the cutting force increases.

A cutter holder according to the present invention has a service life which makes it possible to exchange the blades many times. At the same time one blade can be used in left-hand holders, right-hand holders, central holders and in holders having different cross-sections.

The tool according to the invention permits economizing in materials such as high-speed steel, sintered metals and constructional steel, shortens the time which is necessary for setting and sharpening the tool, renders it possible to increase the cutting parameters, allows economizing in the materials to be cut and improves the quality of the surface obtained.

We claim:
1. A cut-off tool comprising a holder constituted by an elongated main body portion with a longitudinal axis and an integral longitudinally extending side shoulder portion disposed laterally of the main body portion, said side shoulder portion being provided with a longitudinal groove which is inclined at an angle with respect to said longitudinal axis of the main body portion, said groove opening upwardly and having the shape in cross-section of a trapezium with a base of substantial width opposite the open top of the groove, a blade member in said groove, a clamp member secured to said main body portion and including a first depending portion for contacting the blade member and exerting a force perpendicular thereto and an opposite second depending portion received in a groove provided in said main body portion, an adjustment member threadably engaged in said holder and engaged with the blade member at the rearward end thereof to support said blade member thereat, said blade member having side surfaces which converge downwardly and are beveled at their lower ends to form a base portion of trapezium shape corresponding to that of the groove, said side surfaces being disposed in relatively fixed planes, said blade member having a front cutting surface which is substantially perpendicular to said longitudinal axis, said blade member diminishing gradually in height from front to back and a forwardly projecting rib on said shoulder portion disposed beneath the blade member for supporting the front thereof.

2. A tool as claimed in claim 1 wherein said shoulder portion and main body portion include a common downwardly projecting segment at the front of the holder, said segment projecting below a common level of the holder rearwards of said segment, said segment having a rearwardly facing surface located in a plane perpendicular to said longitudinal axis at an intermediate location along the length of the blade member.

3. A tool as claimed in claim 2 wherein said segment has a front face which is inclined upwardly and rearwards.

4. A tool as claimed in claim 3 wherein said rib on the shoulder portion has a front face which is inclined downwardly and rearwards.

References Cited

UNITED STATES PATENTS

| 1,418,987 | 6/1922 | Studinka | 29—96 |
| 2,846,756 | 8/1958 | Novkov | 29—96 |

FOREIGN PATENTS

| 607,417 | 8/1948 | Great Britain. |
| 936,434 | 9/1963 | Great Britain. |
| 891,146 | 11/1943 | France. |

HARRISON L. HINSON, *Primary Examiner.*